US009009302B2

(12) United States Patent
Detienne et al.

(10) Patent No.: US 9,009,302 B2
(45) Date of Patent: Apr. 14, 2015

(54) DYNAMIC GROUP CREATION AND TRAFFIC FLOW REGISTRATION UNDER A GROUP IN A GROUP KEY INFRASTRUCTURE

(75) Inventors: Frederic R. P. Detienne, Harze (BE); Pratima Sethi, Mumbai (IN); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 100 days.

(21) Appl. No.: 13/400,841

(22) Filed: Feb. 21, 2012

(65) Prior Publication Data
US 2013/0219035 A1    Aug. 22, 2013

(51) Int. Cl.
   *G06F 15/173*      (2006.01)
   *G06F 15/16*      (2006.01)
   *H04L 9/08*      (2006.01)
   *H04L 29/06*      (2006.01)
   *H04L 9/32*      (2006.01)

(52) U.S. Cl.
   CPC ............ *H04L 63/065* (2013.01); *H04L 9/0833* (2013.01); *H04L 9/3268* (2013.01)

(58) Field of Classification Search
   CPC ... H04L 41/0893; H04L 63/20; H04L 69/329; H04L 29/06; H04L 63/0263; H04L 63/065; H04L 63/164; H04L 29/12009; H04L 12/4679; H04L 29/12047; H04L 29/12452; H04L 47/10; H04L 47/2441; H04L 61/1541
   USPC .......... 709/223, 224, 225, 230, 232, 237, 231
   See application file for complete search history.

(56) References Cited

U.S. PATENT DOCUMENTS

| | | | |
|---|---|---|---|
| 6,678,835 B1* | 1/2004 | Shah et al. .................... | 714/4.12 |
| 6,708,187 B1* | 3/2004 | Shanumgam et al. ................ | 1/1 |
| 7,272,625 B1* | 9/2007 | Hannel et al. ................. | 709/200 |
| 7,403,980 B2* | 7/2008 | Stringer-Calvert et al. .. | 709/220 |
| 7,434,046 B1* | 10/2008 | Srivastava ..................... | 713/163 |
| 7,558,877 B1* | 7/2009 | Fedyk et al. .................. | 709/242 |
| 7,774,411 B2* | 8/2010 | LeMay et al. ................. | 709/206 |
| 7,827,262 B2* | 11/2010 | Weis ............................. | 709/223 |
| 7,991,836 B2* | 8/2011 | Weis ............................. | 709/203 |
| 2002/0143944 A1* | 10/2002 | Traversat et al. ............. | 709/225 |
| 2002/0156893 A1* | 10/2002 | Pouyoul et al. .............. | 709/225 |
| 2004/0044891 A1* | 3/2004 | Hanzlik et al. ................ | 713/150 |
| 2004/0249911 A1* | 12/2004 | Alkhatib et al. .............. | 709/223 |

(Continued)

OTHER PUBLICATIONS

M. Baugher et al.; Network Working Group; Request for Comments: 3547; "The Group Domain of Interpretation"; Jul. 2003; 42 pages.

*Primary Examiner* — Edward Kim
(74) *Attorney, Agent, or Firm* — Campbell Stephenson LLP

(57) ABSTRACT

Upon detection of a new traffic flow, a registration node can dynamically register the new traffic flow with a key server policy manager by sending a registration request on behalf of the new traffic flow. A registration request indicates the new traffic flow should be protected by a security group. A registration request may also include a request to dynamically generate a new security group to protect the traffic flow. The registration request is received by a key server policy manager, which performs authentication and authorization checks of the requesting registration node, and determines whether to accept or reject the registration request. If accepted, the key server policy manager registers the new traffic flow by including a description of the traffic flow in a group policy of an existing security group or a newly created security group, depending on the registration request.

21 Claims, 8 Drawing Sheets

(56) References Cited

U.S. PATENT DOCUMENTS

| | | | |
|---|---|---|---|
| 2006/0195575 A1* | 8/2006 | Delany et al. | 709/225 |
| 2007/0016663 A1* | 1/2007 | Weis | 709/223 |
| 2007/0274525 A1* | 11/2007 | Takata et al. | 380/270 |
| 2010/0162383 A1* | 6/2010 | Linden et al. | 726/13 |
| 2010/0318605 A1* | 12/2010 | Weis | 709/203 |
| 2011/0296044 A1* | 12/2011 | Weis | 709/230 |
| 2012/0054363 A1* | 3/2012 | Hart | 709/232 |
| 2013/0103834 A1* | 4/2013 | Dzerve et al. | 709/225 |

* cited by examiner

DYNAMIC GROUP CREATION AND TRAFFIC FLOW REGISTRATION UNDER A GROUP IN A GROUP KEY INFRASTRUCTURE

FIELD OF THE INVENTION

This invention relates generally to networking and, more particularly, to encryption schemes that rely upon key servers to distribute group policy to group members.

DESCRIPTION OF THE RELATED ART

Encryption schemes provide secure communications across a network. For example, a stream of communications (also referred to as a traffic flow) in a network in which a group key based encryption scheme is implemented can be protected by a security group. A security group includes a number of network devices (e.g., routing devices) that protect a traffic flow(s) as indicated by group policy of the security group. The security groups and group policy are each manually configured on a key server by a human security administrator. Group policies must also be manually augmented, or reconfigured, by a human security administrator each time the network changes, such as when a new network segment or new multicast source is deployed. Such manual configuration of security groups and group policies by a human security administrator is time-consuming and prone to human error, especially if a key server maintains a complex assortment of group policies for a plurality of security groups.

BRIEF DESCRIPTION OF THE DRAWINGS

A more complete understanding of the present disclosure may be acquired by referring to the following description and accompanying drawings, in which like references numbers indicate like features.

Figure 1:
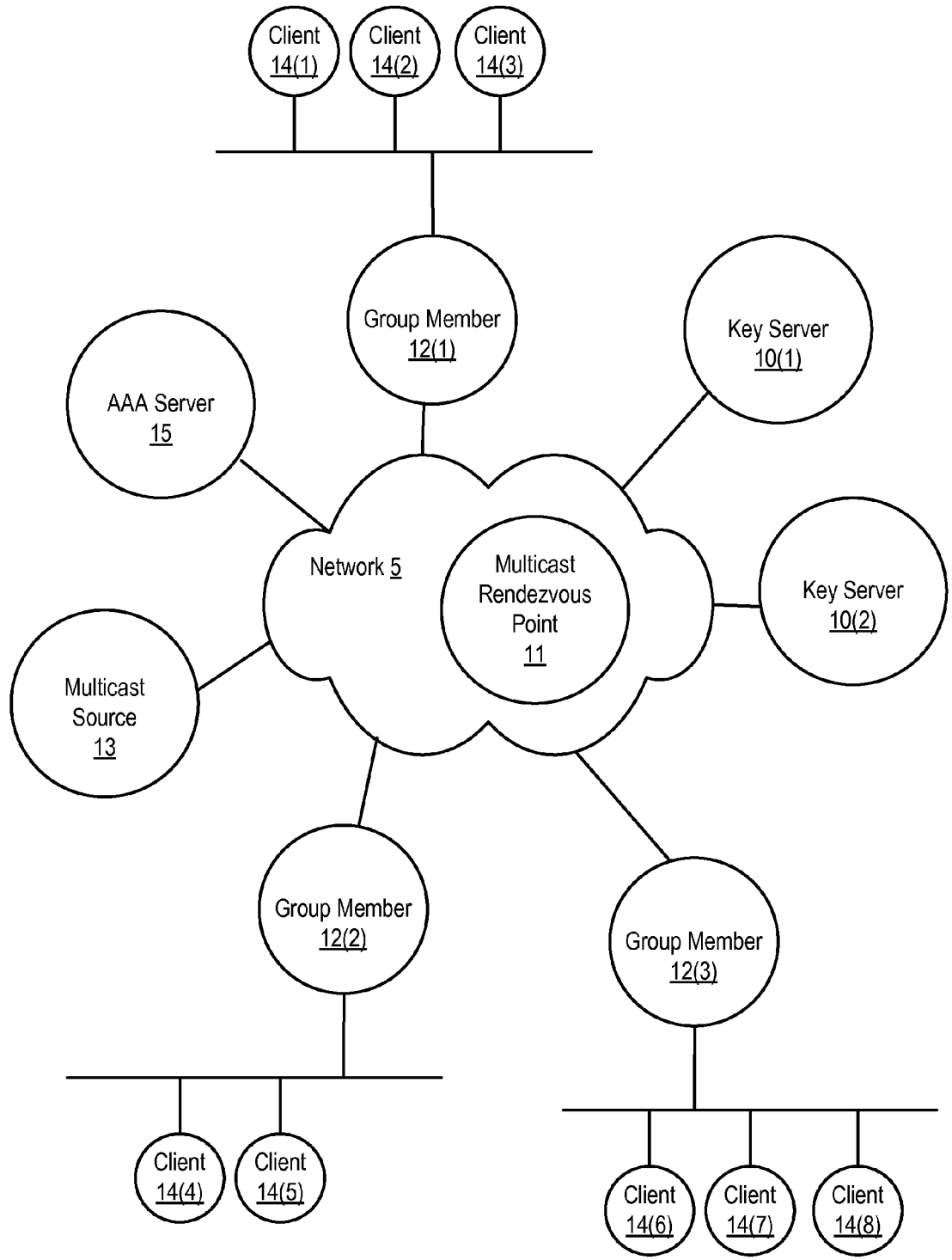
FIG. 1 is a block diagram illustrating relevant components of an example system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

A registration node can dynamically register a traffic flow with a key server policy manager. A registration node can be a trusted group member, key server, multicast source, or multicast rendezvous point. A key server policy manager may be located on a key server, distributed across key servers, or may be located on a network device separate from a key server. A registration node detects a new traffic flow (e.g., upon receipt of data packets of a new traffic flow) in a network, and in response, the registration node sends a registration request on behalf of the new traffic flow to a key server policy manager. A registration request indicates that the new traffic flow should be protected by a security group. A registration request may also include a request to dynamically generate a new security group to protect the traffic flow.

In response to receiving the registration request, a key server policy manager authenticates the requesting registration node and verifies authorization of the registration node to make the registration request. If either of the authentication and authorization checks fail, the registration request is rejected. If the authentication and verification checks are successful, the key server policy manager determines whether to accept or reject the registration request, based on an evaluation of the registration request in light of existing security groups and group policy configured on a key server and a group key based encryption scheme implemented in the network. If the registration request is accepted, the key server policy manager performs the registration request and registers the new traffic flow by including a description of the traffic flow in a group policy of an existing security group or a newly created security group, depending on the registration request. If the registration request is rejected, the key server policy manager does not perform the registration request. The key server policy manager may optionally send an acknowledgement message to the requesting registration node that indicates whether the registration request was accepted or rejected.

Such dynamic or "on the fly" configuration of security groups and group policy allows autonomous operation of key server(s) without requiring a human security administrator each time configuration is needed.

Example Embodiments

FIG. 1 is a block diagram illustrating relevant components of an example system in which the present disclosure can be implemented. A group key based encryption scheme is implemented in the system or network, managed by a key management server, also referred to as a key server. As shown, the system includes various network devices, including key servers 10(1) and 10(2), group members 12(1), 12(2) and 12(3), authentication, authorization and accounting (AAA) server 15, multicast rendezvous point 11 and multicast source 13. Network 5 communicatively couples the network devices of FIG. 1 with one another. Network 5 may include both logical (e.g., logical tunnel) and physical links (e.g., physical Ethernet link). Group members 12(1), 12(2), and 12(3) are also communicatively coupled to clients 14(1)-(8). In some embodiments, key servers can implement group key management protocols, such as Group Domain of Interpretation (GDOI) or Group Secure Association Key Management Protocol (GSAKMP). In some embodiments, a Group Encrypted Transport (GET) based network is implemented. In some embodiments, a Virtual Private Network (VPN) may also be implemented in the network. It is noted that other embodiments can include different numbers and arrangement of network devices and key servers than are shown in this example. For example, an alternative embodiment can include additional or fewer key servers and/or significantly more group members than are shown in the illustrated example.

Key servers 10(1) and 10(2) support a plurality of security groups implemented in the network by maintaining and distributing group policies and group keys of the plurality of security groups, according to the group key based encryption scheme. Key server 10 maintains a data store such as a database or other data structure (e.g., an access control list) that contains the group policies for all security groups currently configured in the network. While at least one key server is needed to perform such functions, more than one key server may be implemented in the network, such as for redundancy (e.g., if a primary key server becomes unavailable, a secondary key server is still available) and load balancing (e.g., responsibility for group members may be divided among the key servers). For example, key servers 10(1) and 10(2) may be cooperative key servers, where group policies and group keys are synchronized among the cooperative key servers.

Group members 12(1), 12(2), and 12(3) are network devices, each of which can be one of various types of network devices, including routers, bridges, gateways, switches, and the like. Some group members (not shown) may also be end devices, host devices, or client devices (e.g., such as personal computers). Each group member 12 registers with a key server 10 to become a member of a security group. Key server 10 authenticates group member 12 (i.e., validates the identity of group member 12) and verifies that group member 12 is authorized to join the security group. If group member 12 is successfully authenticated and authorized, key server 10 completes the registration process by adding group member 12 to the requested security group and sending group policy and group key(s) associated with the security group to group member 12. Group member 12 will use the group key(s) to encrypt and decrypt communications (e.g., traffic flow) of the security group, according to group policy of the security group. Group member 12 may be a member of a plurality of security groups, where group member 12 receives group policy and group key(s) for each security group in which group member 12 is registered.

Each security group secures or protects particular communications, also referred to as traffic flow(s), across network 5. Each security group can be identified by a security group identification or identifier (security group ID), which may be a string of characters representing the security group. Each security group has a one-to-one relationship with a group policy and group key(s) of the security group. Thus, a security group ID will identify a security group, as well as the security group's group policy and group key(s). In fact, the combination of the security group's group policy and group key(s) may itself be the security group ID for the security group.

A group key is a randomly generated number used to encrypt and decrypt traffic flows, and may also be referred to as a traffic encrypting key (TEK). Group members 12 of the same security group possess the same group key(s) for the security group. In this example, group member 12(1) provides encryption for clients 14(1), 14(2), and 14(3); group member 12(2) provides encryption for clients 14(4) and 14(5); and group member 12(3) provides encryption for clients 14(6), 14(7), and 14(8). It is noted that the number of clients coupled to a given group member can vary, as can the total number of clients included within the overall system. In one embodiment, the group members act as Virtual Private Network (VPN) gateways, allowing all of the VPN gateways to encrypt and decrypt packets.

Group policy of a security group includes traffic flow(s) that are protected by the security group and describes how the traffic flow(s) should be handled. Group policy may herein refer to a single group policy covering a particular traffic flow, or may generally refer to all group policies associated with a security group. Group policy includes a traffic flow description of each protected traffic flow(s), where the traffic flow description describes characteristics of the traffic flow. A traffic flow description may describe a traffic flow using origination and destination points, which can include particular Internet Protocol (IP) addresses, network prefixes, or specific port numbers. For example, a traffic flow may originate at a host device or network having a particular IP address or network prefix, and may be destined for a specific port number of another host device having a different IP address. A group policy may also include traffic flow descriptions that describe traffic flow in behavioral terms, which are independent of IP addresses. For example, a traffic flow description may provide that a traffic flow includes packets of a particular type or protocol, such as all voice traffic or all Transmission Control Protocol (TCP) packets.

Group policy also describes how the traffic flow is handled or protected as the traffic flow travels across the network. For example, group member 12(1) may receive content (e.g., data packets) of a traffic flow generated by client 14(1). In response, group member 12(1) determines whether the traffic flow is presently protected by a security group. To do this, group member 12(1) first determines a description or characteristics of the traffic flow. Group member 12(1) then compares the description of the traffic flow of the data packet to group policies of security groups presently configured on group member 12(1) in order to locate a group policy that completely covers the traffic flow. A group policy completely covers a particular traffic flow if the group policy includes a traffic flow description that matches the description of the particular traffic flow. Upon locating a matching group policy, group member 12(1) handles the traffic flow according to the group policy. For example, a matching group policy may indicate that a traffic flow received from client 14(1) must be encrypted by group member 12(1) before being forwarded via network 5 to a destination, such as to group member 12(3). Group member 12(1) will accordingly encrypt the data packets of the traffic flow generated by client 14(1) and will forward the encrypted data packets to their destination.

When group member 12(3) receives a data packet of a traffic flow (e.g., content generated by client 14(1)), group member 12(3) determines whether the traffic flow is presently protected by a security group. To do this, group member 12(3) first determines a description or characteristics of the received traffic flow. Group member 12(3) then compares the description of the received traffic flow to group policies of security group presently configured on group member 12(3) in order to locate a group policy that completely covers or includes the traffic flow (i.e., a group policy that includes a traffic flow description that matches the description or characteristics of the received traffic flow). Upon locating a matching group policy, group member 12(3) handles the data packet according to the group policy. For example, the matching group policy may require that the traffic flow be decrypted before being forwarded to its destination (e.g., client 14(6)). Group member 12(3) will accordingly decrypt the data packets of the received traffic flow and will forward the decrypted data packets to their destination. By encrypting and decrypting the traffic flow according to group policy, group members 12 enforce group policy, and thus protect the traffic flow.

However, if group member 12(3) cannot locate a matching group policy for the received traffic flow, group member 12(3) determines that the received traffic flow is not presently protected by a security group and is a new traffic flow. The new traffic flow should be registered with a key server in order to be covered and protected by a security group (i.e., to be completely covered by group policy of a security group). Rather than send a request to a human security administrator to manually create and/or configure a security group and/or group policy for the new traffic flow, a registration request can be sent to a key server policy manager in order to dynamically register the new traffic flow. A group member, acting as a registration node, can send such a registration request to a key server policy manager.

A registration node may be one of the network devices shown in FIG. 1, including key servers 10(1) and 10(2), group members 12(1), 12(2), and 12(3), multicast rendezvous point 11 and multicast source 13. A key server policy manager (not shown in FIG. 1) may be located on one of key servers 10(1) and 10(2), or may be distributed between key servers 10(1) and 10(2). Alternatively, a key server policy manger may be located on a network device separate from key servers 10(1) and 10(2). A key server policy manager may also be referred to as a policy manager.

A registration node detects a new traffic flow. For example, if a registration node is a group member, the registration node determines that a received traffic flow is a new traffic flow (i.e., is not presently protected by a security group), and thus detects a new traffic flow upon receipt of data packets of a new traffic flow. If a registration node is a key server, the registration node detects a new traffic flow by similarly comparing a received traffic flow to group policies stored on the key server and determining if the received traffic flow is not presently protected by a security group (i.e., is not completely covered by a group policy of a security group). If a registration node is a multicast source, the registration node detects a new traffic flow by determining whether the registration node (as a multicast source) is transmitting a new traffic flow (e.g., transmitting data packets of a new traffic flow). If a registration node is a multicast rendezvous point, the registration node detects a new traffic flow by determining whether a new traffic flow has been registered at the registration node (as a multicast rendezvous point). In some embodiments, a registration node may detect a new traffic flow by being informed that a new traffic flow will be received by the registration node before any data packets of the new traffic flow are sent to the registration node.

In response to detecting a new traffic flow, a registration node dynamically registers the new traffic flow with a key server policy manager by sending a registration request to the key server policy manager on behalf of the new traffic flow. The registration node may send the registration request automatically in response to detecting the new traffic flow. The registration request indicates that a new traffic flow should be protected by a security group. A registration node may send the registration request to a key server policy manager via a traffic registration message, further discussed below in reference to FIG. 2.

A registration request identifies a traffic flow to be protected. A traffic flow may be identified via a traffic flow identification or identifier (traffic flow ID), which is a traffic flow description of the traffic flow to be protected, as discussed above. A traffic flow ID describes characteristics of a traffic flow by describing origination and destination points of the traffic flow, which can include particular Internet Protocol (IP) addresses, network prefixes, or specific port numbers. A traffic flow ID may also identify a traffic flow in behavioral terms or similar descriptive terms, such as a traffic flow including packets of a particular type or protocol. A traffic flow ID may be dependent upon the group key based encryption scheme implemented in the network. For example, in GET VPN, traffic flows are identified by a 5-tuple: source IP address, destination IP address, source port, destination port, and protocol.

A registration request may also identify a security group that should protect the identified traffic flow. A security group may be identified via a security group identification (security group ID) associated with the security group, where each security group has a one-to-one relationship with its associated security group ID. A security group ID may be a string of characters representing a security group. Since each security group has a one-to-one relationship with its associated group policy and group key(s), a security group ID may be a combination of the group policy and group key(s) associated with the security group.

A registration request may also include a request to dynamically create a new security group to protect the identified traffic flow. To do so, a registration node may include a new security group (i.e., a security group that does not presently exist) in the registration request. A new security group indicates (to a receiving key server policy manager) that the new security group should be dynamically created to protect the identified traffic flow. The key server policy manager will evaluate the registration request, including the request to dynamically create the new security group, as further described below.

Upon receipt of a registration request from a registration node, a key server policy manager authenticates the requesting registration node and verifies authorization of the registration node to make the registration request. A key server policy manager authenticates the registration node by validating an identification of the requesting registration node (registration node ID), which may also be included in the registration request or may be sent to the key server policy manager separately. A registration node may use a digital certificate to validate or prove the identification of the registration node to a key server policy manager (e.g., the registration node is a trusted group member, key server, multicast source, or multicast rendezvous point). The digital certificate may be issued by a certificate authority or a trusted third party to a registration node once the registration node has satisfied a security challenge presented by the certificate authority or trusted third party. The registration node is "trusted" once the certificate authority or trusted third party has determined that the registration node is the network device that the registration node claims to be (e.g., group member, key server, multicast source, or multicast rendezvous point). A digital certificate may be obtained by a registration node upon installation of the registration node (e.g., network device) into the network.

A key server policy manager also verifies authorization of the registration node by verifying that the registration node has been assigned administrative rights (i.e., has been granted authority) to make the registration request. For example, if the registration request includes a request to create a new security group, the policy manager determines whether the registration node has been assigned administrative rights that grant the registration node authorization to request creation of a new security group. Administrative rights of registration nodes may be maintained in a data store at a key server or at an authentication, authorization, and accounting (AAA) server. A digital certificate may also be used to verify whether a registration node has been granted administrative rights that authorize the registration node to make the registration request. For example, a digital certificate may itself identify administrative rights of the registration node, or a digital certificate may be used to identify the administrative rights stored on an authentication, authorization and accounting (AAA) server in the network. The key server policy manager can communicate with the AAA server to access the identified administrative rights. Administrative rights are assigned to a registration node by an administrator (and can be assigned at a time the registration node or network device is installed in the network), and may be modified by the administrator, as needed.

The granularity of administrative rights can be adjusted, based on the needs of the network. For example, a registration node may be assigned authorization rights that grant authority to request protection of a new traffic flow, but do not grant authority to request that a new security group be created. Other registration nodes may be granted authority to request protection of a new traffic flow and request that a new security group be created, but only in particular circumstances (e.g., when a new network segment or a new multicast source is added to the network). It is noted that administrative rights are not limited to the scenarios specified herein.

If either of the authentication and authorization checks fail, the registration request is rejected. Optionally, the key server policy manager may send an acknowledgement message to a requesting registration node, indicating whether the key server policy manager has accepted or rejected the registration request. An acknowledgement message may include success and/or failure codes, or reasons for acceptance and/or rejection of the registration request. An acknowledgement message is further discussed below in reference to FIG. 3.

If the authentication and authorization checks are successful, the key server policy manager determines whether to accept or reject the registration request, based on an evaluation of the registration request in light of existing security groups and group policy configured on the key server and the group key based encryption scheme implemented in the network. For example, upon receipt of a registration request identifying a traffic flow (via a traffic flow ID) and a security group (via a security group ID), a key server policy manager determines whether the security group identified by the security group ID presently exists. If the security group exists, the key server policy manager examines (i.e., "walks through") the group policy associated with the security group to see if the group policy already includes the traffic flow ID (i.e., policy manager determines if group policy includes a traffic flow description that matches the traffic flow ID). If the group policy includes the traffic flow ID (and thus completely covers and protects the traffic flow), the registration request is rejected because the traffic flow is presently protected by the security group.

If the group policy of the existing security group (identified via the security group ID) does not include the traffic flow ID, the registration request is accepted. Once the registration request is accepted, the key server policy manager performs the registration request to protect the traffic flow with the security group. In this example, the policy manager dynamically augments or modifies the group policy of the existing security group with the traffic flow ID, such as by adding the traffic flow ID (which is a traffic flow description of the traffic flow) to the group policy. The policy manager may augment the group policy by generating a new group policy for the security group, where the new (augmented) group policy includes the traffic flow ID and replaces any previous version of the group policy in the data store on the key server. If an access control list is implemented to store group policy on a key server, the policy manager overwrites an entry in the access control list that contains the previous group policy with the new (augmented) group policy.

If the security group identified by the security group ID in the registration request does not presently exist, the key server policy manager will also accept the registration request. Since the security group identified by the security group ID does not presently exist, the key server policy manager will interpret the security group ID as an additional request to create a new security group. Once the registration request and the request to create a new security group are accepted, the key server policy manager performs the registration request and the request to create a new security group. In this example, the key server policy manager first performs the request to create a new security group. The key server policy manager dynamically creates a new security group by dynamically generating group policy for the new security group using a group policy template, and dynamically generating group key(s) for the new security group. The policy manager also uses the security group ID of the registration request to identify the new security group. The policy manager then performs the registration request to protect the traffic flow with the new security group. The policy manager may dynamically augment the new group policy to include the traffic flow ID as described above, or alternatively may include the traffic flow ID in the new group policy when the new group policy is created. The new group policy is then stored in the group policy data store on the key server.

A key server policy manager may also determine whether to accept or reject the registration request in light of the group key based encryption scheme implemented in the network. A group key based encryption scheme may implement administrative decisions that affect registration nodes, and thus affect registration requests sent to the key server policy manager. An example of such an administrative decision is whether a registration node should drop or forward packets of a new traffic flow that is not presently protected by a security group. If a registration node is configured to drop packets of a new traffic flow, then only the first registration node to receive the packets will be triggered to send a registration request, since packets of the new traffic flow will not reach other registration nodes. Thus, a key server policy manager will receive a single registration request from the first registration node. However, if the registration node is configured to forward (e.g., flood) packets of a new traffic flow, more than one registration node may receive the new traffic flow. Since receipt of a new traffic flow triggers a registration node to send a registration request, a key server policy manager may receive more than one registration request from different registration nodes, each requesting that the same traffic flow be protected by a new security group. The key server policy manager may decide to accept one of these requests to create the new security group, while rejecting the other requests. The key server policy manager may determine which registration request is accepted, based on the group key based encryption scheme (e.g., based upon administrative decisions implemented in the group key based encryption scheme, such as accepting a registration request of a registration node that is preferred). Optionally, policy manager may send an acknowledgement message to a registration node, indicating whether the policy manager has accepted or rejected the request. The acknowledgement message is further discussed below, in reference to FIG. 3.

A group key based encryption scheme may also affect a registration node's registration request. A registration node may decide whether to request that an existing security group protect the new traffic flow, or request that a new security group be created to protect the new traffic flow, based on administrative decisions implemented in the group key based encryption scheme.

Once the registration request has been performed by the policy manager, the policy manager will update or synchronize the group policy with key servers 10. The group policy (and group key(s), optionally) will be published by the key server to group members of the security group, whether the security group is an existing security group or a new security group. Group key(s) of an existing security group may be optionally rekeyed and published to the group members of the security group.

If a new security group was created, the new security group may have no group members initially, or may have the requesting registration node as a default group member, depending on administrative decisions implemented in the group key based encryption scheme. Group members that wish to join a security group (either an existing security group or a newly created security group) can register with a key server to be added to the security group, in the manner discussed above. The newly joined group member will receive group policy and group key(s) for the security group from the key server. A group member can discover a newly created security group (and other existing security groups) in a manner provided by the group key based encryption scheme implemented in the network.

Group policies may be stored in a data store on a key server, such as in entries of a database table or data structure like an access control list. Each group policy is associated with an expiration period, which is set once a group policy is created. Group policies maintained on a key server must be refreshed (i.e., an expiration period associated with a group policy must be renewed) by at least one group member on a periodic basis. A group member can renew a particular group policy of a security group by sending a registration request to a policy manager. The registration request contains a security group ID of the security group whose group policy needs to be refreshed and a traffic flow ID of a traffic flow protected by the security group. Together, the security group ID and traffic flow ID indicate a particular group policy to be renewed (since a security group may have more than one group policy). If an access control list (ACL) is implemented to store group policies, a traffic flow ID may be an ACL entry that contains the group policy that includes a traffic flow description of the traffic flow. Once the policy manager determines that the security group exists and the security group's group policy already protects the traffic flow (and the registration request is rejected), policy manager will renew or reset the expiration period associated with the group policy. The policy manager also renews or resets an expiration period of a group policy when the group policy is augmented or modified with a new traffic flow (such as when group policy is replaced or overwritten).

Alternatively, a group member may send a separate refresh message to a policy manager to renew the expiration period associated with a group policy of a security group. A refresh message may identify a group policy to be refreshed by including a security group ID associated with the group policy to be refreshed (i.e. the security group ID identifies the security group of the group policy to be refreshed) and a traffic flow ID of a traffic flow protected by the security group. Similarly, if an access control list (ACL) is implemented to store group policies, a traffic flow ID may be an ACL entry that contains the group policy that includes a traffic flow description of the traffic flow. On receipt of the refresh message, policy manager will renew or reset the expiration period associated with the group policy.

If a key server policy manager fails to receive a registration request or refresh message for a group policy before the expiration period elapses, the group policy will expire and the policy manager will remove the group policy from the group policy data store. Thus, if all group members of a security group leave the security group (e.g., the group members are decommissioned), no requests or messages will be sent to the policy manager, and group policy of the security group will be removed from the group policy data store upon elapse of the expiration period. Optionally, a group member may send an explicit request to policy manager to remove a group policy before the group policy has expired (i.e., before the expiration period associated with the group policy elapses).

Figure 2:
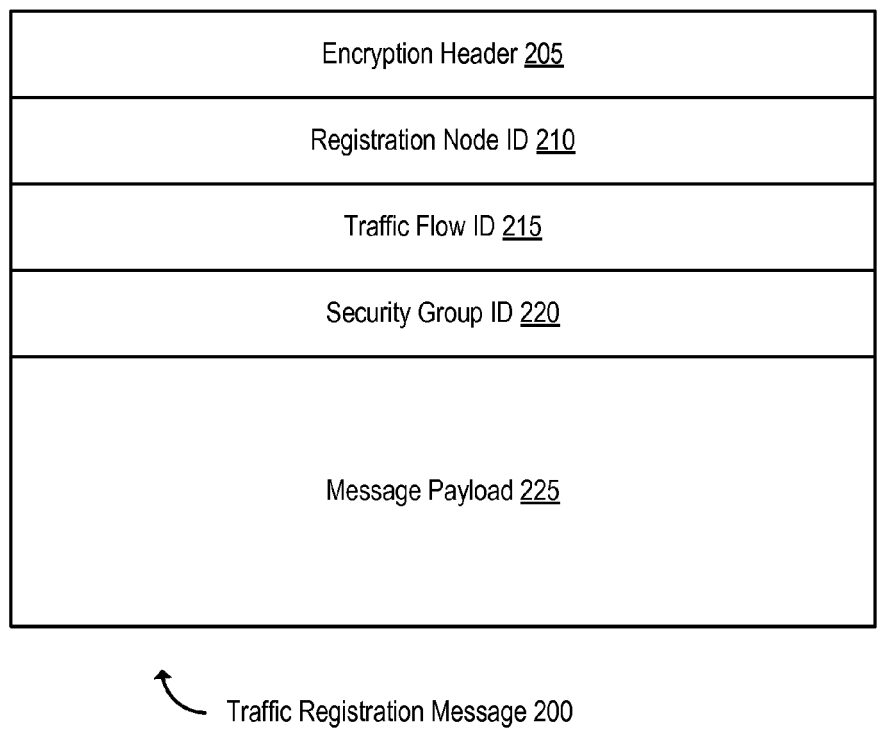
FIG. 2 is a block diagram illustrating relevant components of an example traffic registration message, according to one embodiment.

FIG. 2 is a block diagram illustrating relevant components of an example traffic registration message. A registration request may be sent to a key server policy manager via a traffic registration message 200. Traffic registration message 200 may itself be encrypted as it travels through network 5 from a registration node to a policy manager. As shown, a traffic registration message 200 may include a standard encryption header 205 that can include the source and destination IP addresses of the traffic registration message 200.

A traffic registration message includes a traffic flow identification (traffic flow ID 215) of the new traffic flow to be protected, which identifies or describes characteristics of the new traffic flow, as discussed above. A traffic registration message 200 also includes a security group identification (security group ID 220) of the security group that should protect the new traffic flow. The security group identified in a traffic registration message 200 may or may not exist at the time the traffic registration message 200 is sent by the registration node.

A traffic registration message may also optionally include a registration node identification or identifier (registration node ID 210) of the requesting registration node. A registration node ID may be a digital certificate of the registration node. Registration node ID 210 is used to validate or prove the identification of the registration node to a key server policy manager (e.g., prove that the registration node is a trusted group member, key server, multicast source, or multicast rendezvous point). Alternatively, a digital certificate may be sent to policy manager separately from the traffic registration message 200, eliminating the registration node ID 210 from traffic registration message 200.

Figure 3:
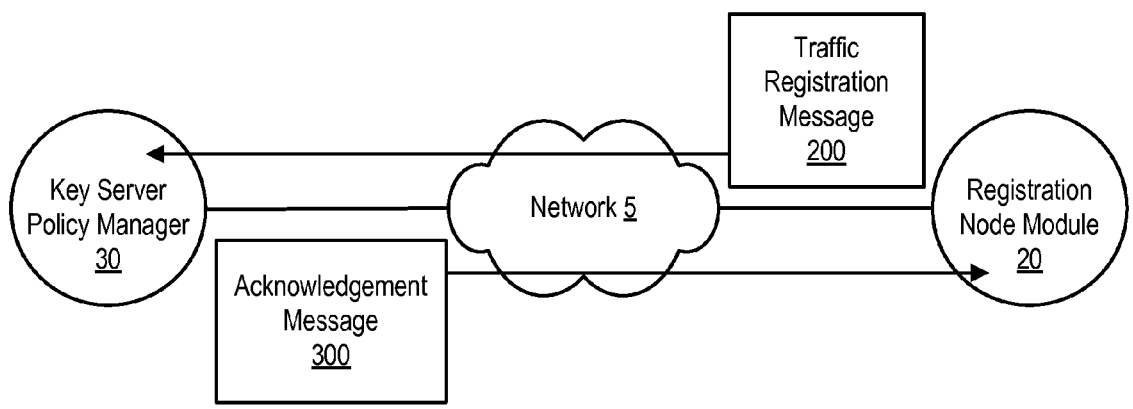
FIG. 3 is a block diagram illustrating relevant components of example transmission paths of a traffic registration message and an acknowledgement message, according to one embodiment.

FIG. 3 is a block diagram illustrating relevant components of example transmission paths of a traffic registration message 200 and an acknowledgement message 300. Registration node module 20 may send a registration request to key server policy manager 30 via a traffic registration message 200.

Registration node module 20 may be located on a key server 10, a group member 12, a multicast rendezvous point 11 and/or a multicast source 13. Key server policy manager 30 may be located on one of key servers 10(1) and 10(2), may be distributed between key servers 10(1) and 10(2), or may be located on a network device separate from key servers 10(1) and 10(2).

After receiving traffic registration message 200, policy manager 30 may reject the registration request contained in traffic registration message 200 for reasons discussed above (e.g., if either of the authentication or authorization checks fail, and/or if the policy manager 30 determines that the registration request should be rejected). If a registration request is rejected, policy manager 30 may optionally send an acknowledgement message 300 to the requesting registration node 20. The acknowledgement message 300 indicates that the registration request has been rejected, and may optionally include failure codes or reason(s) for rejection of the registration request.

If a registration request is accepted, policy manager 30 may optionally send an acknowledgement message 300 to the requesting registration node 20. The acknowledgement message 300 indicates that the registration request has been accepted, and may optionally include success codes or reason(s) for acceptance of the registration request. An acknowledgement message 300 indicating the registration request was successful may not be required if the registration node is a group member or a key server, since the registration node (as a group member or key server) will receive the group policy that includes the new traffic flow (such as when the group policy is published to group members or stored in the data store on the key server). Alternatively, an acknowledgement message 300 indicating the registration request was successful may optionally contain the group key(s) and entire group policy of the security group, which allows the registration node (as a group member) to start enforcing group policy immediately (such as encrypting and decrypting data packets of the traffic flow).

Depending on administrative decisions implemented in the group key based encryption scheme, multiple traffic registration messages 200 may be received from different requesting registration nodes 20, each requesting that the same traffic flow be protected by a new security group. Policy manager 30 may decide to accept one of these registration requests or traffic registration messages 200 and reject the others. Policy manager 30 may send an acknowledgement message 300 to each of the requesting registration nodes 20 that sent a rejected traffic registration message 200. The acknowledgement message 300 may indicate that, while the requesting registration node's specific request to create a new security group has been rejected, a new security group will in fact be created for the traffic flow.

Figure 4:
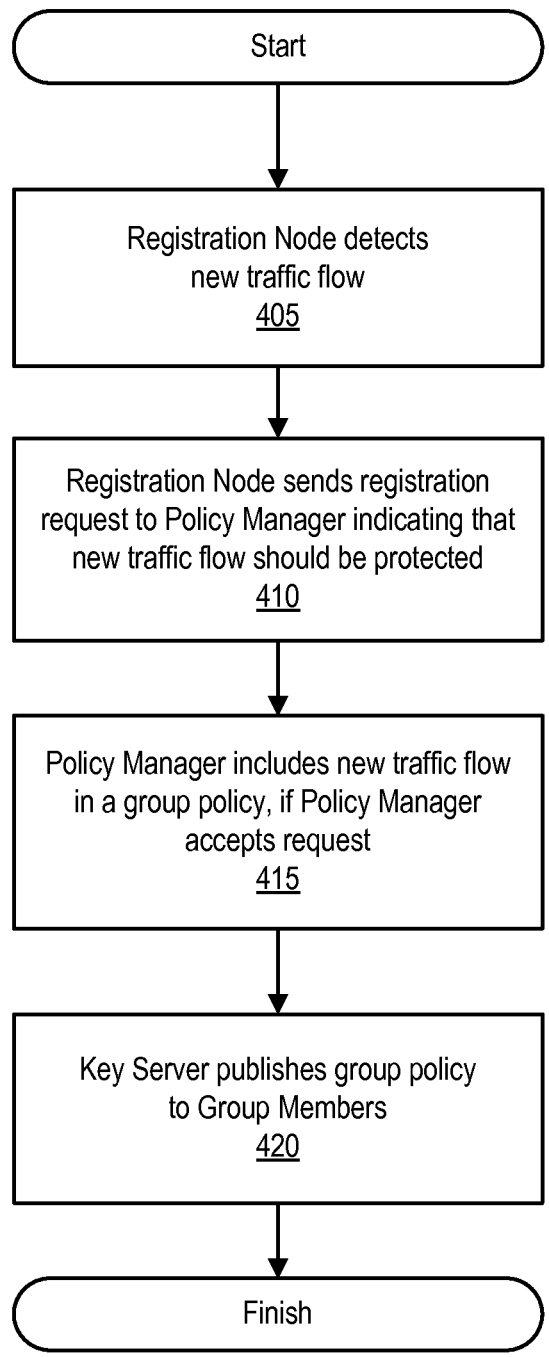
FIG. 4 is a flow chart illustrating relevant acts of an example process implemented by the present disclosure, according to one embodiment.

FIG. 4 is a flow chart illustrating relevant acts of an example process implemented by the present disclosure. The process begins with a registration node detecting a new traffic flow, as shown at step 405. As discussed above, a registration node can detect a new traffic flow by determining whether a received traffic flow is a new traffic flow (i.e., is not presently protected by a security group), or by being informed of a new traffic flow before data packets of the traffic flow are received.

The process continues to step 410, where the registration node sends a registration request to a key server policy manager. As discussed above, the registration request indicates that the new traffic flow should be protected by a security group. A registration request identifies a new traffic flow by including a description of the new traffic flow, and identifies a security group that should protect the new traffic flow by including an identification of the security group. The security group identified in the request may or may not exist at the time the registration request is sent to the policy manager. Also, a registration node may send such a registration request to a policy manager via a traffic registration message.

The process continues to step 415, where the policy manager includes the new traffic flow in a group policy, if the policy manager accepts the registration request. The policy manager first performs an authentication and authorization check, and then determines whether to accept the registration request, as discussed above. If the registration request is accepted, the policy manager includes the description of the new traffic flow in a group policy of an existing security group or a newly generated security group, depending on whether the security group identified in the registration request presently exists or not. The policy manager may optionally send an acknowledgement message to the requesting registration node indicating whether the registration request was accepted or rejected.

Once group policy includes the new traffic flow, the process continues to step 420, where a key server publishes the group policy to group members. A key server may publish the group policy to group members using a push function, as that function may be defined by the group key based management scheme implemented in the system. The key server may also rekey or refresh the group key(s) of the security group and distribute to the group members at this time. The process then ends.

Figure 5:
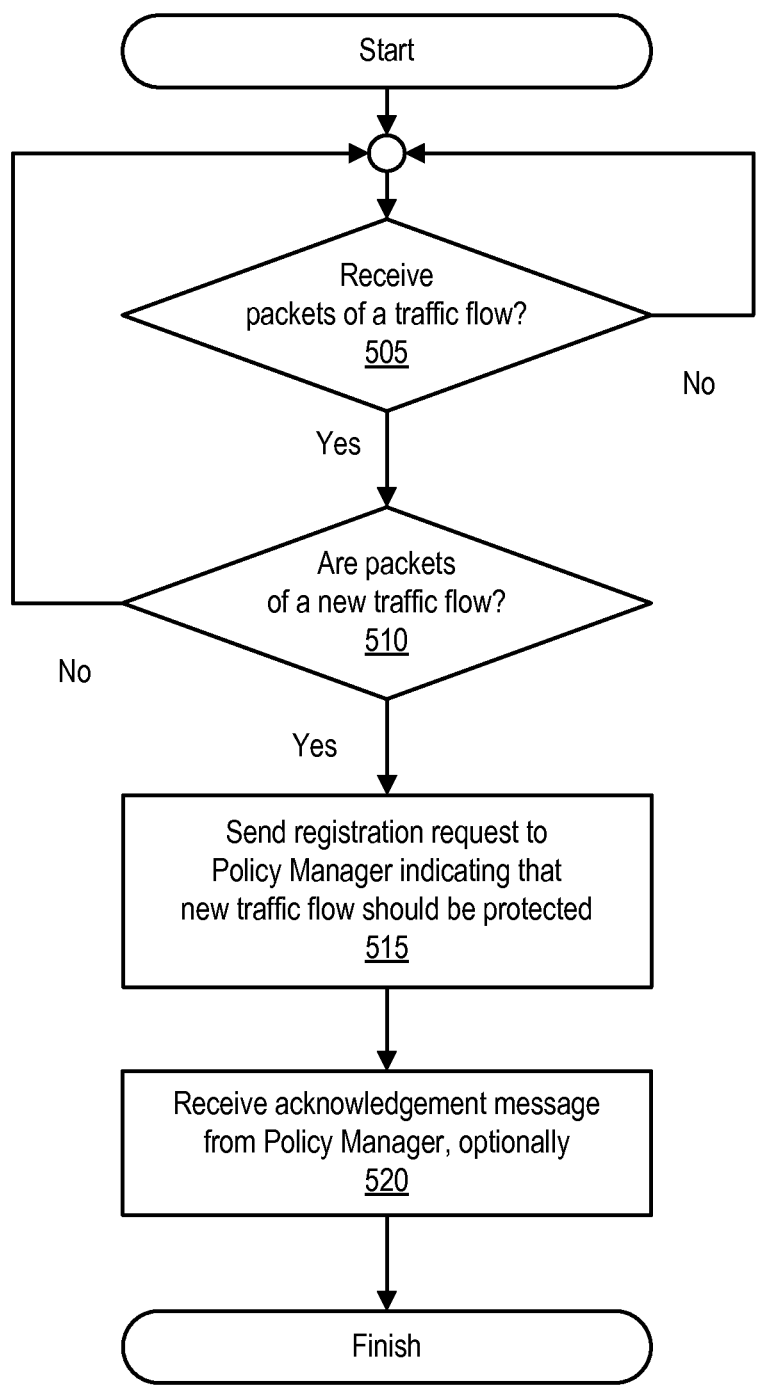
FIG. 5 is a flow chart illustrating relevant acts of an example process implemented by a registration node, according to one embodiment.

FIG. 5 is a flow chart illustrating relevant acts of an example process implemented by a registration node. The process begins at step 505, with a registration node detecting whether packets of a traffic flow have been received. A registration node may detect data packets of a traffic flow upon receipt of the data packets on a port of the registration node. If no packets have been detected, the process returns to step 505, where the registration node continues to detect whether packets have been received.

If packets have been received, the process continues to step 510, where a registration node detects a new traffic flow by determining if the received data packets are packets of a new traffic flow (i.e., is not presently protected by a security group). As discussed above, a registration node can also detect a new traffic flow by being informed of a new traffic flow before data packets of the traffic flow are received (not shown). If no new traffic flow has been detected, the process returns to step 505, where the registration node continues to detect whether packets have been received.

If a new traffic flow has been detected, the process continues to step 515, where the registration node sends a registration request to a policy manager, indicating that the new traffic flow should be protected by a security group. As discussed above, such a registration request identifies a new traffic flow by including a description of the new traffic flow, and identifies a security group that should protect the new traffic flow by including an identification of the security group. The security group identified by the request may or may not exist at the time the registration request is sent to the policy manager. Also, a registration node may send such a registration request to a policy manager via a traffic registration message.

Once the registration node has sent the registration request, the process continues to step 520, where an acknowledgement message is optionally received from the policy manager. As discussed above, an acknowledgement message may be optionally received by a registration node in response to sending a registration request, where the acknowledgement message indicates whether the registration request is accepted or rejected. The process then ends.

Figure 6A:
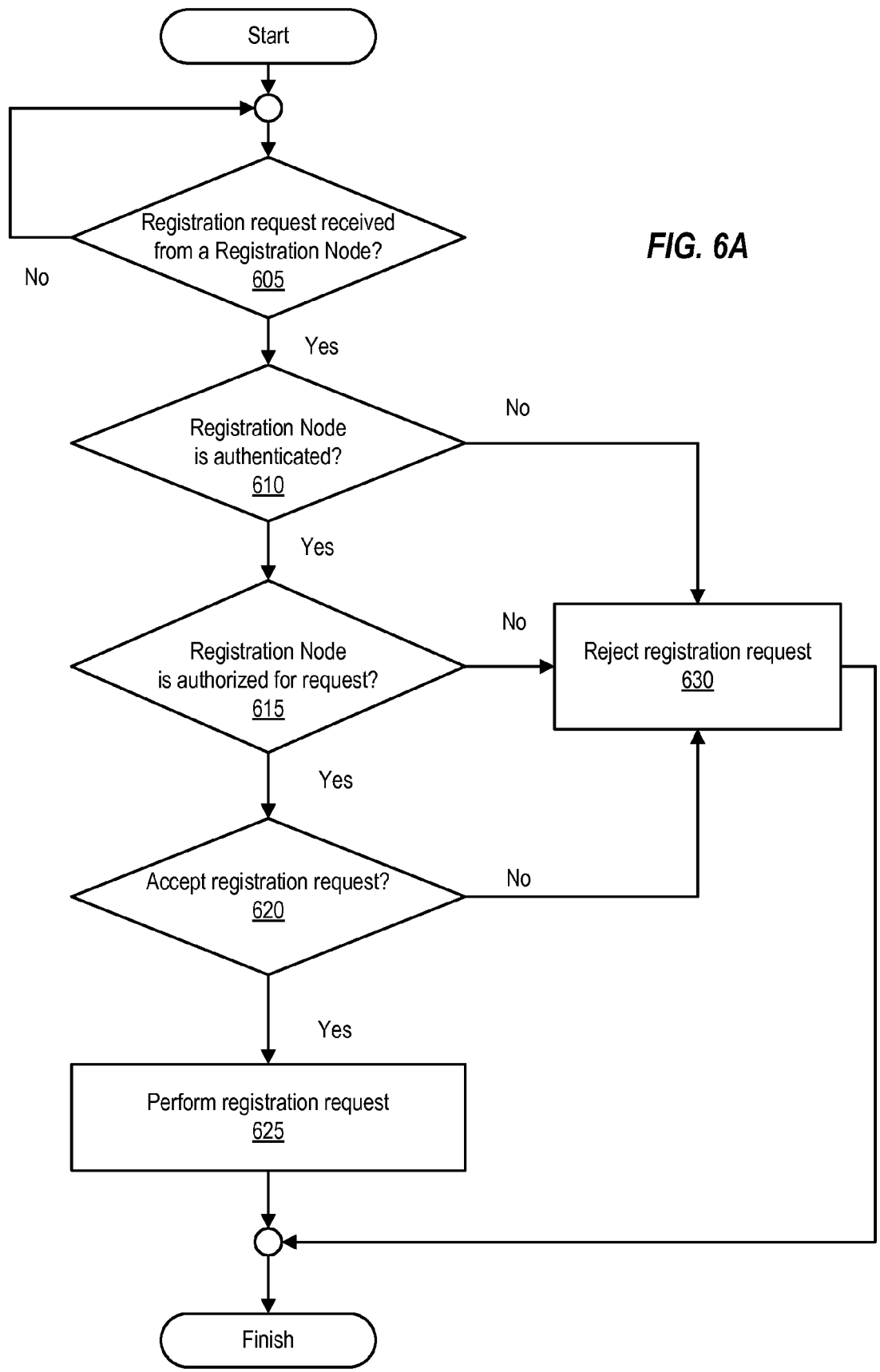
FIG. 6A is a flow chart illustrating relevant acts of an example process implemented by a key server policy manager, according to one embodiment.

FIG. 6A is a flow chart illustrating relevant acts of an example process implemented by a key server policy manager. The process begins at step 605, where a policy manager determines whether a registration request has been received from a registration node. A policy manager may detect that a registration request has been received upon receipt of a message conveying the registration request, such as a traffic registration message. The registration request is received on a port of the network device containing the policy manager, such as a key server or other separate network device. If no registration request has been received, the process returns to step 605, where the policy manger continues to determine whether a registration request has been received.

If a registration request has been received, the process continues to step 610, where the policy manager authenticates the registration node (i.e. validates an identification of the requesting registration node). As discussed above, a registration node may use a digital certificate to validate or prove the identification of the registration node to a policy manager. The digital certificate may be sent to the policy manager by the registration node separately from the registration request (and thus, separately from a traffic registration message containing the registration request). If the identity of the registration node cannot be validated (i.e., the authentication check fails), the registration request is rejected in step 630.

If the authentication check of step 610 is successful, the process continues to step 615, where the policy manager determines whether the registration node has been granted administrative rights that authorize the registration node to make the registration request. As discussed above, a policy manager may verify that a registration node has been granted authority corresponding to the registration request by using a digital certificate to determine the administrative rights of a registration node. The digital certificate may itself identify administrative rights of the registration node, or may be used to identify the administrative rights stored on an authentication, authorization and accounting (AAA) server in the network. If the authority of the registration node cannot be verified (i.e., the authorization check fails), the registration request is rejected in step 630.

If authorization check of step 615 is successful, the process continues to step 620, where the policy manager determines whether the registration request should be accepted or rejected, in a manner as discussed above. If the policy manager determines that the registration request should be rejected, the registration request is rejected in step 630. Although not shown, step 630 may include an optional step to send an acknowledgement message to the sending registration node, indicating that the registration request has been rejected. The process then ends.

If the policy manager determines that the registration request should be accepted, the process continues to step 625, where the registration request is performed by the policy manager. As further discussed above, the policy manager will include a description of the new traffic flow in a group policy of an existing security group or in a newly generated group policy, depending on whether the security group identified in the registration request presently exists or not. Step 625 is further illustrated in FIG. 6B.

Figure 6B:
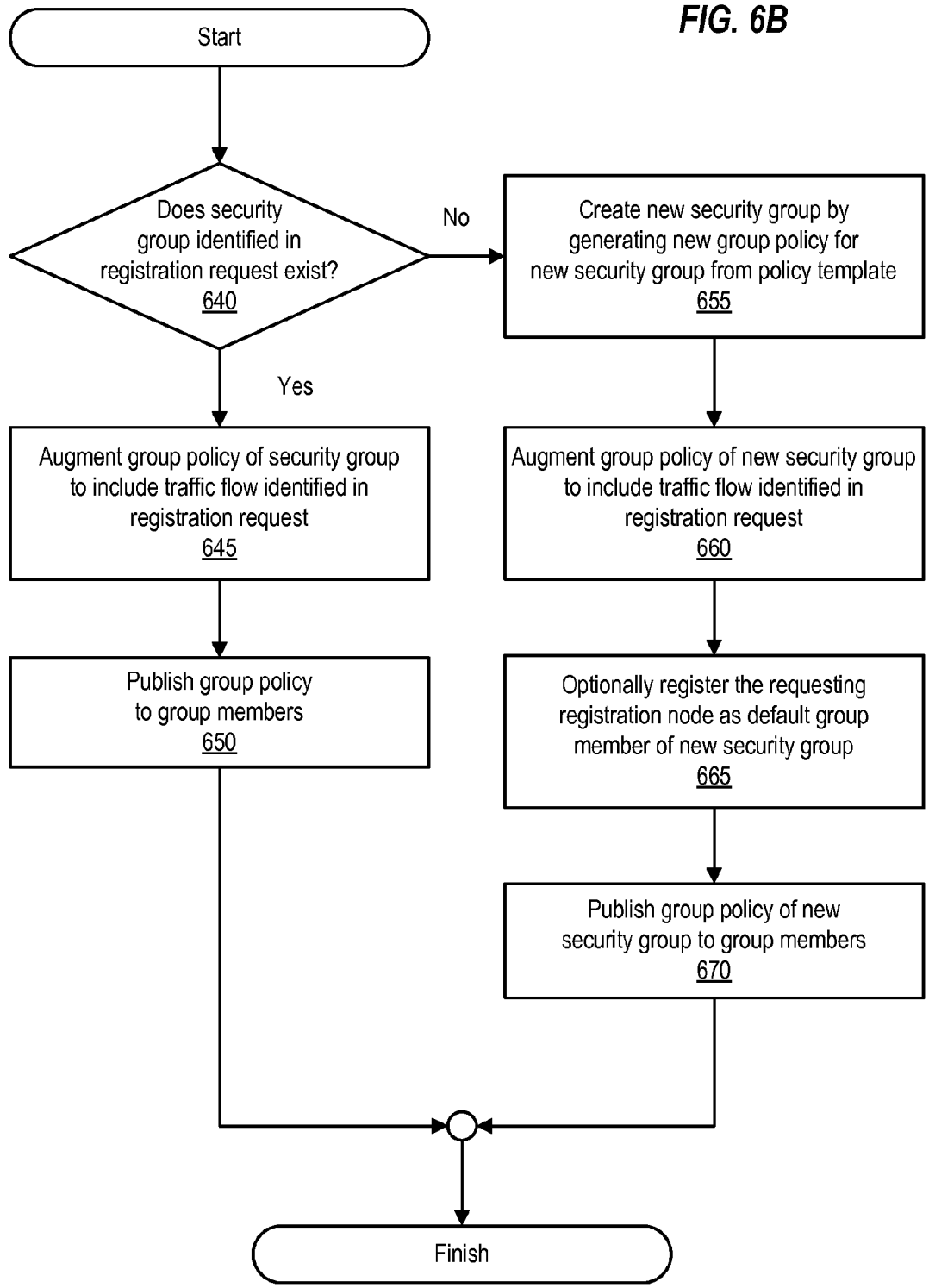
FIG. 6B is a flow chart illustrating relevant acts of an example process implemented by a key server policy manager, according to one embodiment.

FIG. 6B is a flow chart illustrating relevant acts of an example process implemented by a policy manager, which shows how a policy manager performs a registration request (i.e., step 625 of FIG. 6A). The process begins at step 640, where the policy manager determines whether the security group identified in the registration request presently exists.

If the security group does presently exist, the process continues to step 645, where the policy manager augments group policy of the existing security group to cover the traffic flow identified in the registration request. As discussed above, the policy manager augments group policy to include a description of the traffic flow. The augmented group policy replaces any previous version of the group policy in the group policy data store on a key server.

The process continues to step 650, where the group policy is published to group members of the security group. A key server may publish the group policy to group members using existing publishing functions (e.g., push function) of the group key based encryption scheme that is implemented in the network. Optionally, a key server may also rekey or refresh the group key(s) of the security group, which may also be distributed to group members at this time. The process then ends.

Returning to step 640, if the security group does not presently exist, the process continues to step 655, where the policy manager creates a new security group by generating new group policy and group key(s) for the new security group. As discussed above, the policy manager can dynamically generate new group policy from a policy template stored on the policy manager.

The process continues to step 660, where the policy manager augments the group policy of the new security group to include the new traffic flow identified in the registration request. Alternatively, although not shown, the traffic flow may be included in the new group policy when the new group policy is created. Group policy of the new security group can then be stored in a group policy data store on a key server.

The process continues to step 665, where the policy manager optionally registers the requesting registration node as a default group member of the new security group. However, if the registration node is not a group member (e.g., is a key server, multicast source, or multicast rendezvous point), the registration node will not be registered with the new security group.

The process continues to step 670, where the group policy is published to group members of the new security group. As discussed above, a new security group may not have any group members, or may have the requesting registration node as a default group member. A key server may publish the group policy to group members using existing publishing functions (e.g., push function) of the group key based encryption scheme that is implemented in the network. Group key(s) of the new security group may also be published and distributed to group members at this time. The process then ends.

Figure 7:
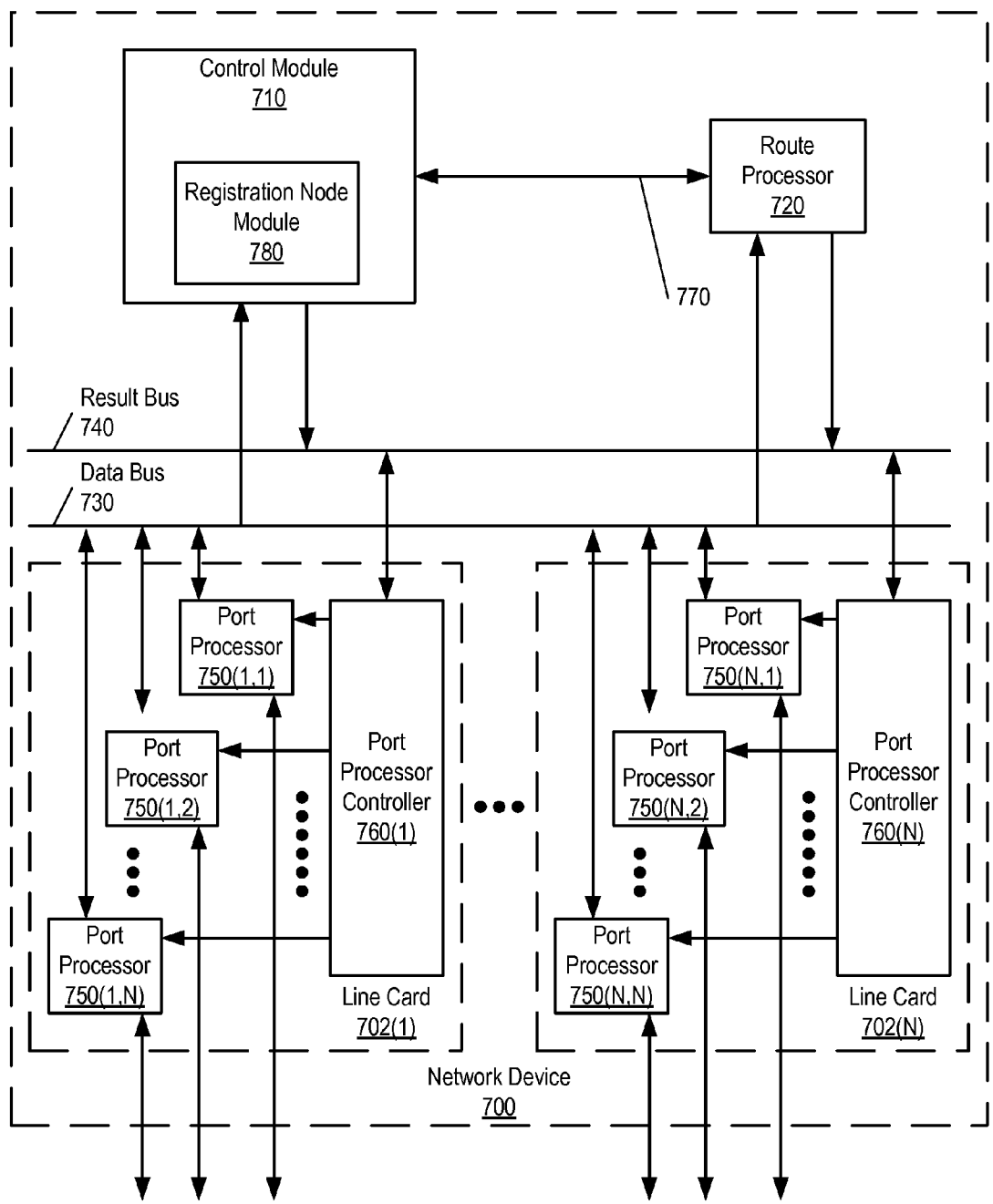
FIG. 7 is a block diagram illustrating relevant components of an example network device in which the present disclosure can be implemented, according to one embodiment.

FIG. 7 is a block diagram illustrating relevant components of an example network device 700 (e.g., key server 10(1) and 10(2), and/or group members 12(1)-12(3), and/or multicast source 13, and/or multicast rendezvous point 11 of FIG. 1). In this depiction, network device 700 includes a number of line cards (line cards 702(1)-702(N)) that are communicatively coupled to a control module 710 (which can include a forwarding engine, not shown) and a route processor 720 via a data bus 730 and a result bus 740. Line cards 702(1)-(N) include a number of port processors 750(1,1)-750(N,N) which are controlled by port processor controllers 760(1)-760(N). It will also be noted that control module 710 and route processor 720 are not only coupled to one another via data bus 730 and result bus 740, but are also communicatively coupled to one another by a communications link 770. It is noted that in alternative embodiments, each line card can include its own forwarding engine.

When a message (e.g., a traffic registration message or an acknowledgement message) is received, the message is identified and analyzed by a network device such as network device 700 in the following manner. Upon receipt, a message (or some or all of its control information) is sent from one of the port processors 750(1,1)-750(N,N) at which the message was received to one or more of those devices coupled to data bus 730 (e.g., others of port processors 750(1,1)-750(N,N), a forwarding engine, and/or route processor 720). Handling of the message can be determined, for example, by a forwarding engine. For example, a forwarding engine may determine that the message should be forwarded to one or more of port processors 750(1,1)-750(N,N). This can be accomplished by indicating to corresponding one(s) of port processor controllers 760(1)-760(N) that the copy of the message held in the given one(s) of port processors 750(1,1)-750(N,N) should be forwarded to the appropriate one of port processors 750(1,1)-750(N,N).

Network device 700 can implement a registration node module 780 (e.g., in control module 710, as shown, or in one of port processor controllers 760(1)-760(N) and/or in route processor 720) in order to act as a registration node that detects a new traffic flow and sends a registration request to a key server. Network device 700 can alternatively implement a key server policy manager module, not shown, (e.g., in control module 710 or in one of port processor controllers 760(1)-760(N) and/or in route processor 720) that responds to and processes a registration request from a registration node. Registration node module 780 can thus implement one or more of the methods illustrated in FIGS. 4 and 5, while key server policy manager module can implement one or more of the methods illustrated in FIGS. 4 and 6A-6B.

Figure 8:
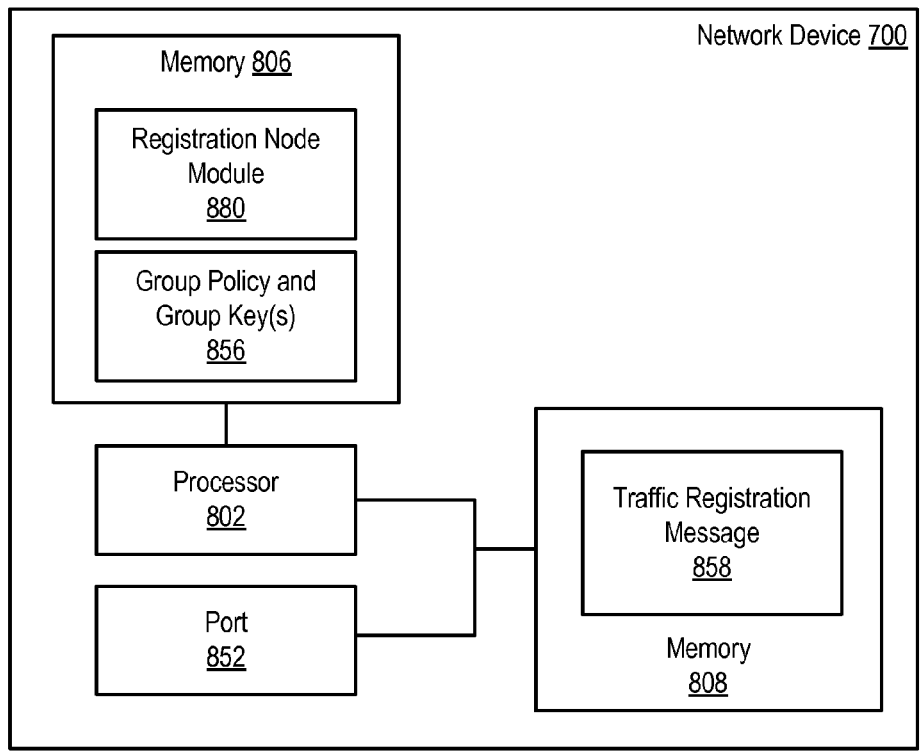
FIG. 8 is a block diagram illustrating relevant components of an example network device in which the present disclosure can be implemented, which illustrates how the present disclosure can be implemented in software for a registration node, according to one embodiment.

FIG. 8 is a block diagram illustrating relevant components of an example network device 700, in which the network device is configured as a registration node (e.g., one of key servers 10(1)-(2), group members 12(1)-12(3), multicast rendezvous point 11, and multicast source 13 of FIG. 1). As illustrated, network device 700 includes one or more processors 802 (e.g., microprocessors, PLDs (Programmable Logic Devices), or ASICs (Application Specific Integrated Circuits)) configured to execute program instructions stored in memories 806 and/or 808. Memories 806 and 808 can include various types of RAM (Random Access Memory), ROM (Read Only Memory), Flash memory, MEMS (Micro Electro-Mechanical Systems) memory, and the like. Network device 700 also includes one or more ports 852 (e.g., one or more hardware ports or other network interfaces that can be linked to other network devices, hosts, servers, storage devices, or the like). Processor 802, port 852, and memories 806 and 808 are coupled to send and receive data and control signals by one or more buses or other interconnects.

In this example, program instructions executable to implement a registration node module 880 are stored in memory 806. Registration node module 880 includes the functionality needed to act as a registration node within a group key based encryption scheme, such as detecting a new traffic flow and sending a registration request for the new traffic flow to a key server (e.g., to perform one of the methods illustrated in FIGS. 4 and 5). Group policy and group key(s) 856 of the security groups configured on the registration node (if any) can also be stored in memory 806. The registration request may be contained in a traffic registration message 858 that can be stored in memory 808.

Figure 9:
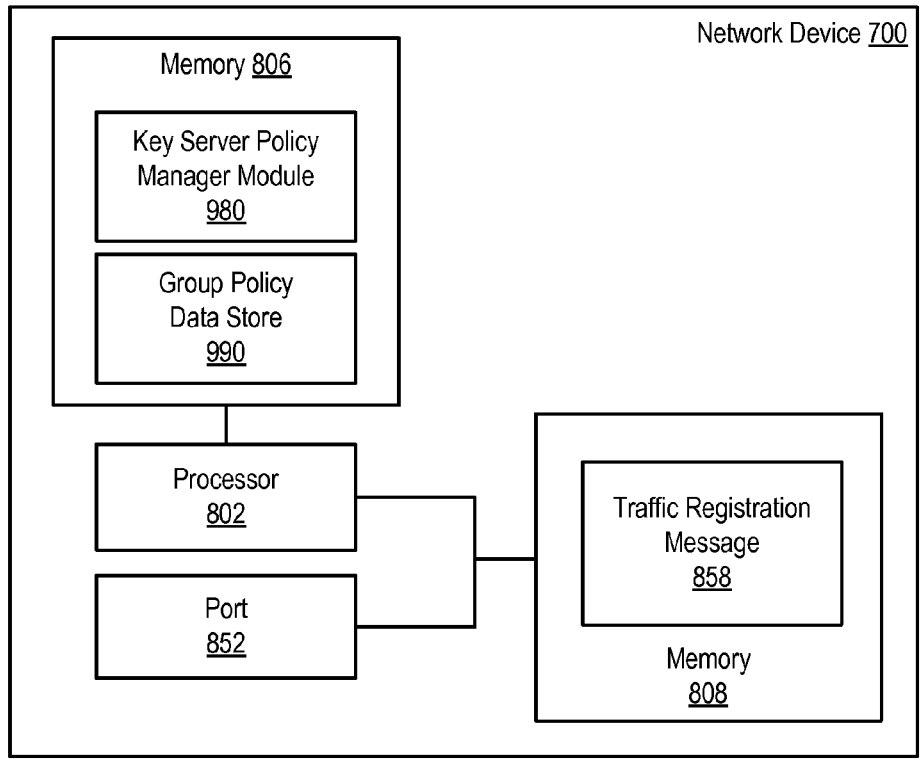
FIG. 9 is a block diagram illustrating relevant components of an example network device in which the present disclosure can be implemented, which illustrates how the present disclosure can be implemented in software for a key server policy manager, according to one embodiment.

FIG. 9 is a block diagram illustrating relevant components of an example network device 700, in which the network device is configured as a key server policy manager (e.g., key server 10 of FIG. 1, which includes a key server policy manager). In this example, program instructions executable to implement a key server policy manager module 980 are stored in memory 806. Key server policy manager module 980 includes the functionality needed to act as a key server policy manager within a group key based encryption scheme, including functionality to respond to and process a registration request from a registration node (e.g., to perform one of the methods illustrated in FIGS. 4 and 6A-B). All or part of a group policy data store 990 identifying all current group policies can also be stored in memory 806. The registration request may be contained in a traffic registration message 858 can be stored in memory 808.

It is noted that the program instructions and/or data executable to implement registration node module 880 and key server policy manager module 980 can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like. In order be executed, the software is loaded into memory from another computer readable storage medium. The instructions and/or data can also be transferred to a computing device for storage in memory via a network such as the Internet or upon a carrier medium.

Although the present invention has been described with respect to specific embodiments thereof, various changes and modifications may be suggested to one skilled in the art. It is intended such changes and modifications fall within the scope of the appended claims.

What is claimed is:

1. A method, comprising:
   receiving a registration request to dynamically register a traffic flow, wherein
      the registration request is sent from a registration node,
      the registration request is received at a key server policy manager,
      the key server policy manager and the registration node are communicatively coupled via a network, and
      the registration request comprises a group identifier (ID);
   determining whether to accept the registration request; and
   performing the registration request, in response to a determination to accept the registration request, wherein the performing the registration request comprises
      determining whether the group ID identifies a new security group that does not presently exist in the network, and
      in response to determining that the group ID identifies the new security group that does not presently exist in the network, creating the new security group identified by the group ID.

2. The method of claim 1, wherein
   the registration request comprises a traffic flow identifier,
   the traffic flow identifier identifies the traffic flow, and
   the registration request indicates that the new security group should protect the traffic flow.

3. The method of claim 1, wherein the determining whether to accept the registration request is based on administrative decisions implemented in an encryption scheme that is implemented in the network.

4. The method of claim 1, wherein the performing the registration request further comprises:
   generating a new group policy for the new security group, wherein
      the new group policy protects the traffic flow, and
      the creating the new security group comprises
         storing the new group policy in a new entry in a group policy data store.

5. The method of claim 4, further comprising:
registering the registration node as a default group member of the new security group, subsequent to the performing the registration request; and
publishing the new group policy to one or more group members of the new security group, subsequent to the performing the registration request.

6. The method of claim 1, further comprising:
authenticating the registration node using a registration node identifier; and
verifying authorization of the registration node to make the registration request.

7. A method, comprising:
detecting a new traffic flow at a registration node, wherein
the new traffic flow is identified by a new traffic flow identifier (ID), and
the new traffic flow ID does not match any traffic flow IDs present in existing group policies configured at the registration node; and
sending a registration request to a key server policy manager, wherein
the registration request comprises
a request to dynamically register the new traffic flow,
the new traffic flow identifier, and
a group ID that identifies a security group that should protect the new traffic flow.

8. The method of claim 7, further comprising:
receiving an acknowledgement from the key server policy manger, wherein
the acknowledgement indicates acceptance or rejection of the registration request.

9. The method of claim 7, further comprising:
receiving publication of a group policy, wherein the group policy comprises the new traffic flow identifier; and
refreshing the group policy, wherein the refreshing renews an expiration period associated with the group policy.

10. A system comprising:
one or more processors; and
one or more memories coupled to the one or more processors and configured to
store instructions executable by the one or more processors, the instructions configured to implement
a policy manager configured to
receive a registration request to dynamically register a traffic flow, wherein
the registration request is sent from a registration node,
the policy manager and the registration node are communicatively coupled via a network, and
the registration request comprises a group identifier (ID),
determine whether to accept the registration request, and
perform the registration request, in response to a determination to accept the registration request, wherein the policy manager is further configured to
determine whether the group ID identifies a new security group that does not presently exist in the network, and
in response to a determination that the group ID identifies the new security group that does not presently exist in the network, create the new security group identified by the group ID.

11. The system of claim 10, wherein
the registration request comprises a traffic flow identifier,
the traffic flow identifier identifies the traffic flow, and
the registration request indicates that the new security group should protect the traffic flow.

12. The system of claim 10, wherein
the policy manager is further configured to accept the registration request based on administrative decisions implemented in an encryption scheme that is implemented in the network.

13. The system of claim 10, wherein
the policy manager is further configured to
generate a new group policy for the new security group, wherein
the new group policy protects the traffic flow, and
store the new group policy in a new entry in a group policy data store.

14. The system of claim 13, wherein the instructions are further configured to implement
a key server configured to
register the registration node as a default group member of the new security group, subsequent to performance of the registration request, and
publish the new group policy to one or more group members of the new security group, subsequent to performance of the registration request.

15. The system of claim 10, wherein
the policy manager is further configured to
authenticate the registration node using a registration node identifier, and
verify authorization of the registration node to make the registration request.

16. The system of claim 10, wherein the instructions are further configured to implement
a registration node module configured to
detect a new traffic flow, wherein
the new traffic flow is identified by a new traffic flow identifier (ID), and
the new traffic flow ID does not match any traffic flow IDs present in existing group policies configured at the registration node; and
send the registration request to the policy manager, wherein
the registration request comprises
the traffic flow identifier, and
the group ID.

17. The system of claim 16, wherein
the registration node module is further configured to
receive an acknowledgement from the policy manger, wherein
the acknowledgement indicates acceptance or rejection of the registration request.

18. The system of claim 16, wherein
the registration node module is further configured to
receive publication of a group policy, wherein the group policy comprises the new traffic flow identifier; and
refresh the group policy, wherein the refreshing renews an expiration period associated with the group policy.

19. An apparatus comprising:
a line card configured to receive a registration request to dynamically register a traffic flow, wherein
the registration request is sent from a registration node,
the registration node and the line card are communicatively coupled via a network, and
the registration request comprises a group identifier (ID); and
a control module coupled to the line card, the control module configured to
determine whether to accept the registration request, and perform the registration request, in response to a determination to accept the registration request, wherein the control module is further configured to
determine whether the group ID identifies a new security group that does not presently exist in the network, and
in response to a determination that the group ID identifies the new security group that does not presently exist in the network, create the new security group identified by the group ID.

20. An apparatus comprising:
a line card configured to receive packets; and
a control module coupled to the line card, the control module configured to
detect packets of a new traffic flow, wherein
the new traffic flow is identified by a new traffic flow identifier (ID), and
the new traffic flow ID does not match any traffic flow IDs present in existing group policies configured at a registration node, and
send a registration request to a key server policy manager, wherein
the registration request comprises
a request to dynamically register the new traffic flow,
the new traffic flow identifier, and
a group identifier (ID) that identifies a security group that should protect the new traffic flow.

21. The method of claim 7, wherein
the registration node and the key server policy manager are communicatively coupled via a network, and
the group ID identifies one of
a new security group that does not presently exist in the network, and
an existing security group.

* * * * *